United States Patent [19]

Salvi et al.

[11] Patent Number: 6,081,700
[45] Date of Patent: Jun. 27, 2000

[54] RADIO HAVING A SELF-TUNING ANTENNA AND METHOD THEREOF

[75] Inventors: Raul Salvi, Boca Raton; Gustavo D. Leizerovich, Miami Lakes, both of Fla.

[73] Assignee: Motorola, Inc., Schaumburg, Ill.

[21] Appl. No.: 08/767,659

[22] Filed: Dec. 17, 1996

[51] Int. Cl.[7] .................................................. H04B 1/18
[52] U.S. Cl. ................ 455/193.3; 455/67.4; 455/226.1; 455/330
[58] Field of Search ................................ 455/67.1, 67.4, 455/226.1, 226.2, 226.3, 193.1, 193.3, 195.1, 340, 259, 234.1, 330

[56] References Cited

U.S. PATENT DOCUMENTS

| | | | |
|---|---|---|---|
| 4,334,323 | 6/1982 | Moore | 455/340 |
| 4,984,293 | 1/1991 | Cummings et al. | 455/226.1 |
| 5,001,776 | 3/1991 | Clark | 455/234.1 |
| 5,101,509 | 3/1992 | Lai | 455/340 |
| 5,301,358 | 4/1994 | Gaskill et al. | 455/226.2 |
| 5,423,070 | 6/1995 | Vaisanen et al. | 455/226.1 |
| 5,438,699 | 8/1995 | Coveley | 455/226.1 |
| 5,493,710 | 2/1996 | Takahara et al. | 455/259 |
| 5,745,844 | 4/1998 | Kromer et al. | 455/186.1 |
| 5,754,560 | 5/1998 | Nousiainen et al. | 455/67.4 |

*Primary Examiner*—Reinhard J. Eisenzopf
*Assistant Examiner*—Darnell R. Armstrong
*Attorney, Agent, or Firm*—Daniel K. Nichols; Charles W. Bethards

[57] ABSTRACT

A radio (100) includes a receiver circuitry (106) for use in conjunction with a tunable antenna (101). The radio includes a controller (122) which may be a digital signal processor. The controller (122) controls various radio functions including tuning of the antenna (101), measurement of the quality of received signals, and generation of a test signal. The radio is capable of generating a test signal on a desired frequency, which is radiated within the radio, received at the antenna (101) and then processed by receiver circuitry (106). Its quality is then measured and used to control the tuning of the antenna (101). The test signal generated by the controller (122) can be mixed up to the desired frequency by using one or more of the local oscillator signals of the radio.

17 Claims, 2 Drawing Sheets

RADIO HAVING A SELF-TUNING ANTENNA AND METHOD THEREOF

FIELD OF THE INVENTION

This invention relates to radio receivers, and more particularly to an apparatus and method of tuning an antenna of a receiver.

BACKGROUND OF THE INVENTION

Presently, most radios require some form of manual tuning of the antenna of the radio and/or the radio itself, in the factory, prior to shipment. Such tuning procedures, external test equipment, special test fixtures, and trained personnel are required. In addition, the tuning procedures can be quite costly and increase the manufacturing time of a radio. This is partly due to the fact that newer radios often utilize ultra or sub-miniature components which may require specialized tools and test equipment for proper tuning.

Once these tuning procedures or tuning adjustments are completed in the factory, it is quite possible that the radio will have to be re-adjusted in the future due to degradation of the electronic components within the radio circuitry or a change of frequency or operating environment of the radio. This can require for instance, the radio being taken out of service by the subscriber, and then sent back to the factory or service depot for readjustment.

If the radio includes a transmitter or is a transceiver, antenna tuning is typically accomplished by using the radio's transmitter and the required internal circuitry or external test equipment to measure the voltage standing wave ratio (VSWR), the forward or reflected radio frequency (RF) power, or the return loss and adjusting the transmitter accordingly for the most optimum performance. If the radio is a transceiver (a radio including both a transmitter and a receiver in the same package using the same antenna) the tuning accomplished between the transmitter and the antenna, may have to suffice for the receiver as well. This design is typically acceptable, however, the tuning or coupling between the antenna and receiver, may be less then optimum, thus degrading the sensitivity or other characteristics of the radio receiver.

Still, other radio systems include stand alone receivers which, require tuning between the antenna and the receiver RF circuitry, but provide for few acceptable methods for accomplishing this in the field without external test equipment.

Another aspect may be the re-tuning of an antenna with a radio for a change in frequency, location, system, or for ever changing environmental conditions in the radio coverage area to enhance a radios performance at all times of operation.

Clearly, a need exists for an approach to accurately, cost effectively and rapidly, self-tune a radios antenna to a radio receiver or transceiver without special tools, test equipment, or trained personnel in the field.

A method and apparatus that can automatically accomplish antenna tuning with a radio receiver is highly desirable.

DETAILED DESCRIPTION OF THE PREFERRED EMBODIMENT

Figure 1:
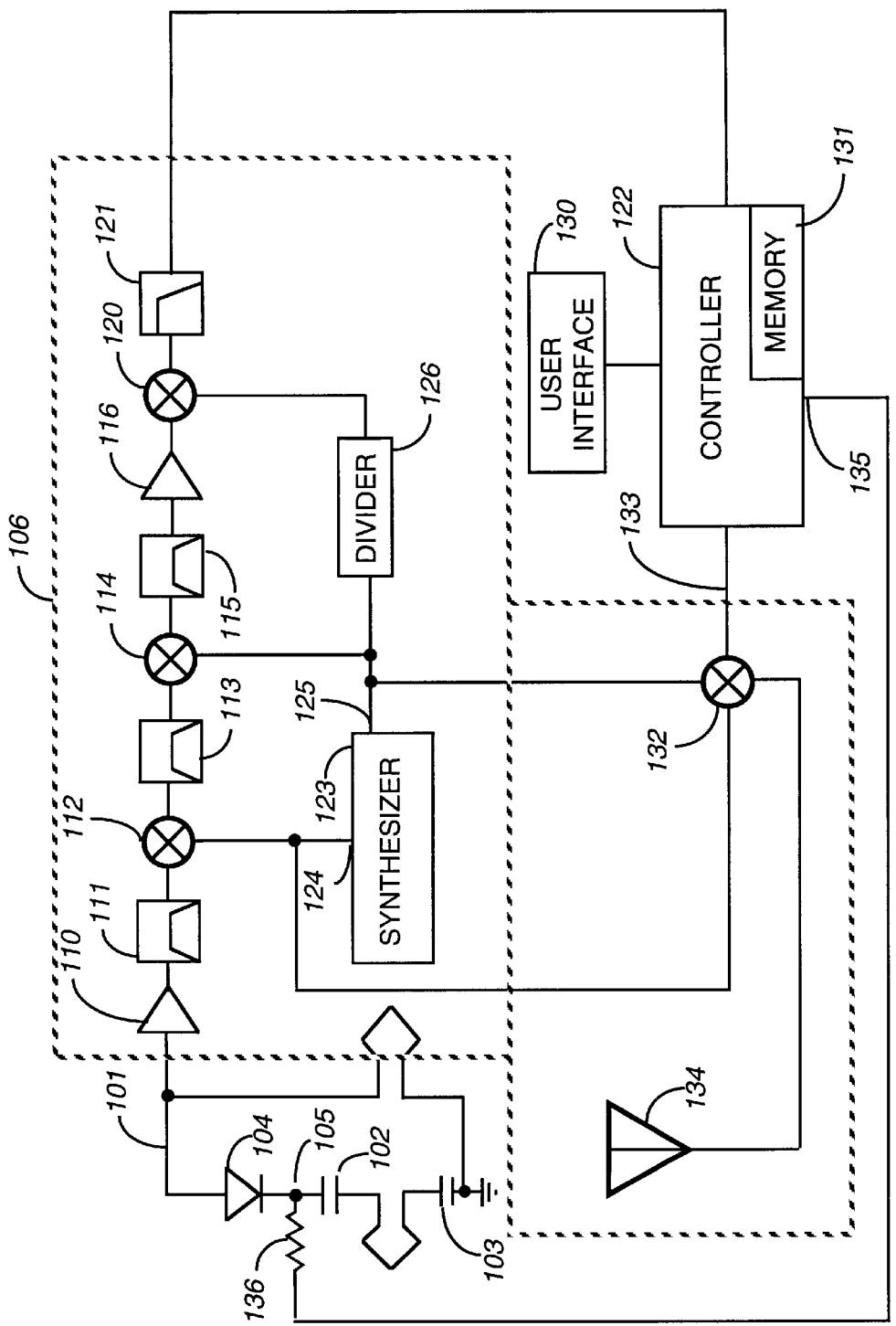
FIG. 1 is a block diagram of a radio in accordance with the present invention.

Referring now by characters of reference to the drawings and first to FIG. 1, it will be understood that the radio indicated generally by 100 includes an antenna 101. In the preferred embodiment, the antenna 101 is a loop antenna which includes capacitors 102 and 103 as well as a varactor diode or variable capacitor 104, and a tuning input 105. The radio 100 includes receiver circuitry 106. The antenna 101 has an output coupled to a preamplifier 110 which is in turn coupled to a bandpass filter or preselector 111. The output of bandpass filter 111 goes to a first mixer 112 which has its output coupled through a bandpass crystal filter 113 to a second mixer 114. The output of the second mixer 114 is coupled via filter 115 to an amplifier 116. In the preferred embodiment, the output of amplifier 116 is provided to a third mixer 120 whose output is filtered by a low pass filter 121. The output of filter 121 is the low intermediate frequency (IF) signal of the receiver circuitry 106. In the preferred embodiment, this low IF signal is processed by a controller comprising a digital signal processor (DSP) 122.

The DSP 122 also provides several functions for the radio 100 including the recovery of information from the receiver circuitry 106, detection of the received signal, signal quality measurements, synthesis and modulation of audio and digital test signals, output of control signals for tuning of the antenna 101, acts as the controller for the radio 100, and controls various radio functions such as that of a synthesizer 123. For purposes of clarity, the various control lines from DSP 122 are not shown in this figure.

The synthesizer 123 has an output 124 that provides a first local oscillator signal, which is applied to the mixer 112, and an output 125 that provides a second local oscillator signal which is applied to the mixer 114. The second local oscillator signal is also applied to a divider 126 whose output provides a third local oscillator signal which is applied to the mixer 120.

The DSP 122 is also coupled to a user interface 130. The user interface can include user controls, a display, and/or audio output devices. Typically, the DSP 122 includes internal memory 131 which can function as a code plug for the radio.

The radio 100 includes a self test generator for generating a test signal. A mixer 132 is utilized to produce the test signal. The mixer 132 mixes the first local oscillator and second local oscillator signals along with a signal provided at an output 133 of DSP 122. The output of mixer 132 is coupled to a radiator 134, preferably within the radio 100.

Figure 2:
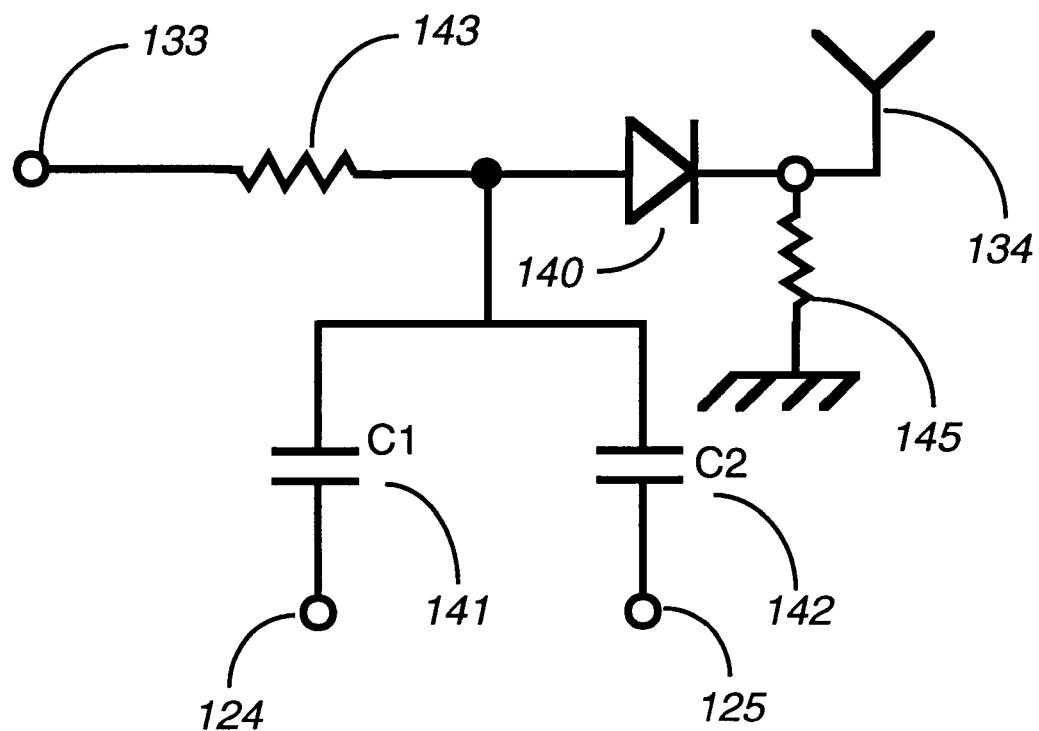
FIG. 2 is a schematic diagram of a test signal mixer of the radio of FIG. 1.

Referring now to FIG. 2, the mixer 132 as shown is illustrated in further detail. The mixer 132 includes a diode 140 which serves as a nonlinear element to accomplish the mixing of the various signals. The first local oscillator signal is supplied from synthesizer output 124 via capacitor 141, to the anode of diode 140 while the second local oscillator signal, from output 125, is additionally coupled via capacitor 142 to the diode's anode. The output 133 of DSP 122 is coupled to the diode's anode via a resistor 143. A resistor 145 provides a DC path to ground from the cathode of diode 140, which is also coupled to radiator 134.

In normal receive operation of the radio 100, a desired signal is picked up at the antenna 101, converted down to a low intermediate frequency (IF) by the receiver circuitry 106, and then the information is recovered at the DSP 122. The information could be digital, analog, or other type modulation. It will be understood that a loop antenna 101 internal within a radio such as a paging receiver, two-way pager, or other radio receiver communication device, typically has a narrow band resonance characteristic. It is therefore necessary that the resonant frequency of the antenna be appropriately chosen for the desired frequency of operation. This antenna can be tuned by varying the capacitance of the varactor diode 104 which is accomplished by providing a bias voltage from the DSP 122 via a control output 135, which is coupled via a resistor 136 to the cathode of varactor diode 104.

The radio 100 can self tune its antenna by radiating a signal from radiator 134 which is then received via antenna 101. It will be appreciated that a closed control loop is provided, and the DSP 122 can monitor the signal quality of the received signal and adjust the capacitance of varactor diode 104 until a peak quality or predetermined quality level is achieved. The quality measurement can be the received signal strength (RSSI) of the receiver if desired, a bit error rate (BER) can be monitored or a signal to noise ratio or (SINAD) measurement can be monitored by the DSP. For example, in the preferred embodiment the DSP is used to provide an output signal at output 133 by providing a signal at 455 KHz which is modulated with a 1 KHz test tone. The output signal also includes a DC offset voltage which is used to bias on the mixer 132. This signal is applied to mixer 132 along with the first and second local oscillator signals and the resulting mixer product to include a signal component at the desired receive frequency.

Referring to FIG. 2, the diode 140 is biased on by the DC offset voltage from the DSP 122. It will be appreciated that once the DC bias is removed from diode 140, the diode will not be forward biased, and therefore it will not be activated and will not mix the first and second local oscillator signals. The mixed signal, which is radiated from radiator 134 and then received by antenna 101 is measured by the DSP 122. The control voltage from DSP 122 can then be varied tuning the varactor diode 104. The quality of the received signal is monitored by DSP 122 in order to peak or optimize the tuning of the antenna 101. For single frequency receiver operation, this value can then be stored and if desired, periodically updated to repeak or retune the antenna. If the radio 100 is to be operated on multiple frequencies or used as a transmitting antenna in a transceiver, the antenna 101 and the varactor diode 104 of the antenna 101 can be tuned for any and all desired operating frequencies, and the memory 131 off the DSP 122 can store the pertinent tuning information for each operating frequency. If a large number of frequencies are to be used, the band can be characterized at various points in the operating band and that information may be stored and then either utilized for sub-band segments, or tuning voltages interpolated from the stored information. It will be appreciated that by utilizing the self tuning of the radio 100, it is not necessary to use external signal generating equipment or test equipment for purposes of tuning the antenna 101. This obviates the necessity of doing such tuning in the radio factory and facilitates the retuning of the radio antenna for any new desired operating frequency within the operating range of the radio 100. Additionally, the antenna tuning can be reoptimized as desired, for instance, every time the radio is powered up or as needed. For example, proximity to external objects can effectively de-tune an antenna. If a signal of inadequate strength is received as a result, the controller 122 can initiate a self-test tune operation and re-tune the antenna 101 for its current operating environment.

It will be appreciated that while a particular method of generating the test signal, which involves mixing a signal up utilizing the receiver local oscillator signals is described, the radio could also use a separate signal generator approach rather than the use of the local oscillator signals. For example, an additional synthesizer output at an appropriate frequency may serve the same function as the local oscillator outputs.

For completeness of the disclosure, a brief description of the antenna adjustment operation of the radio 100 will be given. When it is desired to self-tune the radio, a test signal is generated within the radio at a desired receive frequency. A test signal is generated by having the DSP 122 synthesize an injection signal that is applied to the mixer 132. This is mixed with the first local oscillator signal which might be, for instance, 890 MHz and the second local oscillator signal which might be 45.555 MHz while the signal from the DSP is at 455 Khz with a DC offset. This 455 KHz signal is then subtracted from the products of the mixer to produce the desired mixer output signal of 935.100 MHz. This test signal is then coupled with the RF load resistor 145 to ground to dissipate a portion of the RF energy before radiated by the radiator 134 and subsequently received by antenna 101. The quality of the received test signal is measured within DSP 122 and the antenna 101 is subsequently tuned by the control signal from DSP 122 based upon the quality of the received test signal. The test signal from DSP 122 which is generated at 455 KHz, in the preferred embodiment, is at an intermediate frequency of the radio. Consequently, it is mixed with at least one local oscillator to produce the test signal. As described in the preferred embodiment, it is also mixed with the radio second intermediate frequency.

Depending upon the particular application desired, the quality measurement can be any or all of the typical quality measurements of a radio signal. One approach is to use a signal to noise ratio measurement which can be referred to as SINAD. When utilizing a SINAD test, the test signal that is synthesized by the DSP 122 includes a modulated test tone preferably in the audio voice frequency range (300 to 3000 Hz). Such SINAD quality measurements are typically used for checking and optimizing radio receivers when operating as, for example, analog voice or utilizing data link modems using audio tones such as Bell 202 standards for data rates up to 1200 Bps, quadrature differential phase shift keying for data rates up to 2400 Bps and quadrature amplitude modulation for data rates up to 9600 Bps.

When measuring signal strength or RSSI, typically an unmodulated test signal is provided by the DSP 132. In this approach, the amplitude or strength of the received signal is monitored as the signal quality measurement. For bit error rate (BER) measurements which are often used in digital data applications, the test signal from the DSP 122 is modulated with digital data. The digital data can use modulation formats such as two level or four level frequency shift keying (FSK), quadrature amplitude modulation (QAM) and the like. These types of data are typically sent at rates of 300 Bps through 9600 Bps, using narrow band radio services. When using the BER method the DSP 122 produces a test signal that includes a predetermined bit pattern which may be used at different data rates. The DSP 122 would then compare the received digital bit pattern which was generated and determined bit errors in the received signal. It will be appreciated that depending upon the application of the radio any or all of the signal quality measurements can be implemented in a radio.

It will be appreciated by those of ordinary skill in the art that the apparatus and methods disclosed provide various approaches for a radio having a self-tuning antenna.

It will be apparent to one of ordinary skill in the art that the disclosed invention can be modified in numerous ways and can assume many embodiments other than the embodiment specifically set out and described above. For example, many of the inventive procedures and apparatus described in the embodiment for a radio having a self-tuning antenna will work equally well for other radio related communication or navigational systems. Accordingly, it is intended that the appended claims cover all modifications which fall within the true spirit and scope of the invention.

What is claimed is:

1. A radio comprising:
   a receiver for receiving radio signals on at least one frequency;
   a tunable antenna for providing the radio signals to the receiver;
   a test signal generator for generating a test signal at least said one frequency and for coupling the test signal to the tunable antenna;
   a controller coupled to the receiver, the controller being responsive to the received test signal for providing a control signal for tuning the antenna;
   the receiver including at least a first local oscillator and a second local oscillator for providing a first local oscillator signal and a second local oscillator signal; and
   the test signal generator including an injection signal generator for providing an injection signal, and a mixer for mixing the first and second local oscillator signals with the injection signal to produce the test signal, the mixer comprises:
   a mixer diode;
   a first capacitor coupling the first local oscillator to the mixer diode;
   a second capacitor coupling the second local oscillator to the mixer diodes; and
   a resistor coupling the injection signal generator to the mixer diode.

2. A radio as defined in claim 1, in which the test signal generator includes a radiator coupled to the mixer.

3. A radio as defined in claim 1, in which a synthesizer comprises said first and second local oscillators.

4. A radio comprising:
   a receiver for receiving radio signals on at least one frequency;
   a tunable antenna for providing the radio signals to the receiver;
   a test signal generator for generating a test signal at least said one frequency and for coupling the test signal to the tunable antenna; and
   a controller coupled to the receiver, the controller being responsive to the received test signal for providing a control signal for tuning the antenna,
   the receiver including at least a first local oscillator for providing a first local oscillator signal; and
   the test signal generator including an injection signal generator for providing an injection signal having a direct current voltage offset, and a mixer comprising a diode for mixing the first local oscillator with at least the injection signal to produce the test signal and for utilizing the direct current voltage offset for biasing on the mixer.

5. A radio as defined in claim 4 in which the controller comprises a digital signal processor which comprises the injection signal generator.

6. A radio as defined in claim 4 in which the controller includes a signal quality detector for determining the quality of the received test signal.

7. A radio as defined in claim 6 in which said signal quality detector comprises a signal to noise ratio detector.

8. A radio as defined in claim 7 in which said signal to noise ratio detector comprises a digital signal processor.

9. A radio as defined in claim 6 in which said signal quality detector comprises a bit error rate detector.

10. A radio as defined in claim 9 in which said bit error rate detector comprises a digital signal processor.

11. A radio as defined in claim 6 in which said signal quality detector comprises a received signal strength detector.

12. A radio as defined in claim 11 in which said received signal strength detector comprises a digital signal processor.

13. A method of self tuning an antenna of a radio having first and second intermediate frequencies comprising the steps of:
   generating first and second local oscillator signals;
   generating a test signal within the radio at a desired receive frequency by;
   generating a first signal at the radio's second intermediate frequency; and
   mixing the first signal with the first and second local oscillator signals to produce the test signal;
   receiving the test signal at the antenna;
   measuring the quality of the received test signal; and
   tuning the antenna based upon the quality of the received test signal.

14. A method of self tuning an antenna of a radio as defined in claim 13 wherein the step of measuring the quality comprises measuring the signal strength of the received test signal.

15. A method of self tuning an antenna of a radio as defined in claim 13 wherein the step of generating the test signal comprises generating a modulated test signal.

16. A method of self tuning an antenna of a radio as defined in claim 15 wherein the step of measuring the quality comprises measuring the signal to noise ratio of the received test signal.

17. A method of self tuning an antenna of a radio as defined in claim 15 wherein the step of measuring the quality comprises measuring the bit error rate of the received test signal.

\* \* \* \* \*